United States Patent [19]

Schmitt et al.

[11] 4,389,427

[45] Jun. 21, 1983

[54] PROCESS FOR THE CONTINUOUS ROASTING OF COCOA KERNEL PASTE

[76] Inventors: Armin Schmitt, Am Birkeneck 88, 6056 Heusenstamm; Rüdiger Nosthinski, Frankenstr. 1, 6051 Dietzenbach-Steinberg, both of Fed. Rep. of Germany

[21] Appl. No.: 330,856

[22] Filed: Dec. 14, 1981

Related U.S. Application Data

[63] Continuation-in-part of Ser. No. 136,399, Apr. 1, 1980, abandoned, which is a continuation-in-part of Ser. No. 948,248, Oct. 3, 1978, abandoned.

[51] Int. Cl.³ ............................................... A23G 1/02
[52] U.S. Cl. ..................................... 426/631; 426/460
[58] Field of Search ............... 426/631, 460, 466, 475, 426/476, 519; 99/516, 485; 366/172, 313

[56] References Cited

U.S. PATENT DOCUMENTS

| | | | |
|---|---|---|---|
| 1,768,230 | 6/1930 | Borg | 426/631 |
| 2,189,144 | 2/1940 | Klewer | 426/631 |
| 3,506,245 | 4/1970 | Noschinski et al. | 366/172 |
| 3,754,928 | 8/1973 | Haney | 426/631 |
| 3,778,519 | 12/1973 | Taralli et al. | 426/631 |
| 3,904,777 | 9/1975 | Goerling et al. | 426/631 |
| 3,955,489 | 5/1976 | Goerling et al. | 426/631 |
| 3,985,607 | 10/1976 | Schmitt | 159/6 W |

*Primary Examiner*—Hiram H. Bernstein
*Attorney, Agent, or Firm*—Posnack, Roberts, Cohen & Spiecens

[57] ABSTRACT

A process for the continuous roasting of liquid cocoa paste from raw, shelled, predried, broken and crushed cocoa beans, whereby the liquid cocoa paste for roasting is applied continuously as a thin layer onto a surface over which the paste runs, the paste being rinsed with a gas flowing in countercurrent. Heat is generated in the thin layer of paste by shearing and friction forces and the paste is constantly partially lifted out of the layer and sprayed back again into the layer, to which gas in the form of hot air is supplied in countercurrent along and through the respraying region, whereby the paste is brought to roasting temperature in a first phase and then kept at roasting temperature in a second phase and the temperature of the paste is lowered in a final phase.

21 Claims, 4 Drawing Figures

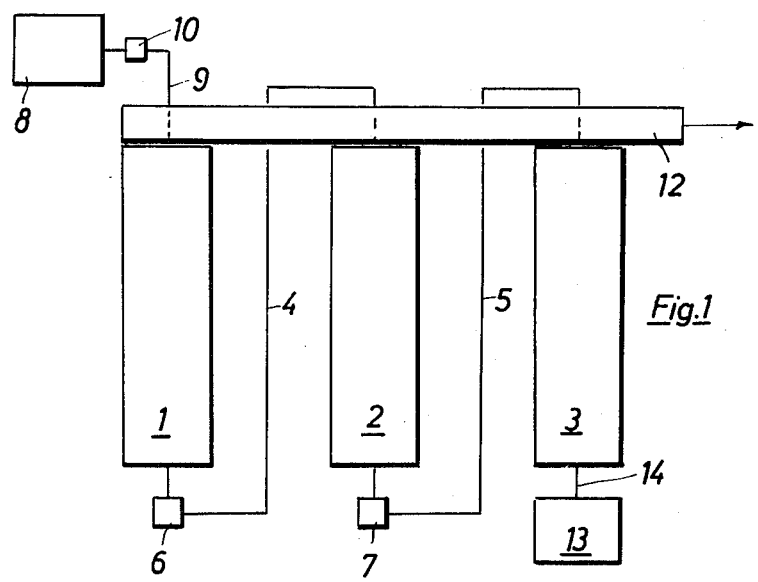
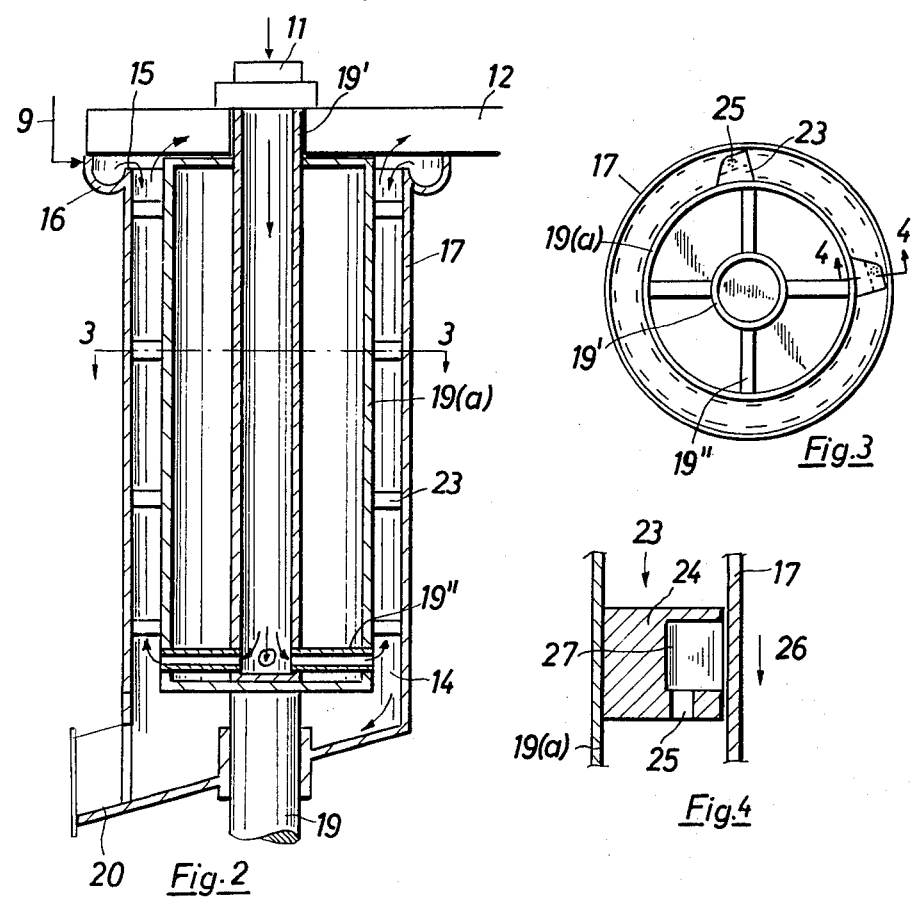

PROCESS FOR THE CONTINUOUS ROASTING OF COCOA KERNEL PASTE

This application is a continuation-in-part of Ser. No. 136,399, filed Apr. 1, 1980, now abandoned, which is a continuation-in-part of Ser. No. 948,248, filed Oct. 3, 1978 and now abandoned.

FIELD OF INVENTION

The invention relates to processes for the continuous roasting of cocoa kernel paste or cocoa liquid from raw, shelled, predried, broken and crushed cocoa beans.

BACKGROUND

The basic problem involved in the roasting of cocoa beans or cocoa kernel fragments lies in the relatively large dimensions of the particles of roasting material and their widely different size distribution. This results in large temperature gradients between the surfaces of the particles of roasting material and their centers. Overroasting and/or underroasting thereby become virtually unavoidable.

This problem has been recognized for more than 50 years and has led to the notion of crushing raw cocoa beans into a pulpy or liquid cocoa paste, spreading the latter in a thin layer on smooth, moving surfaces heated to roasting temperature, and roasting the paste by heating the same to approximately 100° to 150° C.

There has also been previously described in U.S. Pat. No. 3,955,489 (Goerling et al.) a process which provides for the continuous preparation of roasted cocoa paste from a thin liquid paste made from dried, shelled and crushed cocoa beans. The paste is conveyed continuously in a layer having a thickness of 1 to 2 mm. within a period of time having a duration of 1 to 5 minutes over a surface heated to a maximum of 150° C. A gas is directed over the thin layer in countercurrent thereto and the cocoa paste leaving the heating surface is cooled immediately to 80° C.

The above process is intended to avoid the defects of known processes which have found no acceptance in practice and to achieve various advantages by using a thin-layer evaporator. However, comparative tests conducted with this process have shown that even such a process does not lead to the desired achievement of optimal aroma formation with an economically justifiable expenditure. This may be the reason why this process, also, as far as is known, has likewise found no acceptance in cocoa processing practice.

In terms of equipment, an obstacle standing in the way of the practical realization of this known process is that a disproportionately large area is required if a layer having a thickness of approximately 0.5 mm. and a conventional throughput of 1,000 kg./h. is adopted. With a necessary duration of the paste in the roasting region of approximately 12.25 minutes and a layer width of 1 m., the result is a belt length of 340 m. which is difficult to put into practice and demands a corresponding plurality of thin-layer evaporators.

If there were to be used for the roasting process, known thin-layer evaporators in which a 4-blade rotor, engaging in the layer of paste and having a diameter of 300 mm. and a length of 2.2 m., rotates in a vertical, tubular housing heated from outside, then 14 such evaporators would be required for a throughput of 1,000 kg./h., allowing for a corresponding layer volume.

Furthermore, if considered for roasting by this process, thin-layer evaporators have, on an average, a clearance of around 1.5 mm. between the scrapers and the wall. Narrower production tolerances are economically impractical for equipment of the required size, apart from the fact that a sufficiently large clearance must remain to insure that a thin layer can form again behind the rotor blades. The layer picked up by the rotor may partly stay for an uncontrollably long time on the heated wall and is therefore necessarily overroasted.

In addition, the paste develops a strong $CO_2$ formation in the form of very fine bubbles and swells to approximately double the volume. However, since the boundary layer towards the wall cannot be scraped, strong thermal insulation occurs which considerably worsens the transfer of heat from the wall to the paste. This is due to the fact that the coefficient of thermal conductivity of the cocoa paste is 0.3 kcal/m.h.°C. whereas the coefficient of thermal conductivity of $CO_2$ gas is 0.02 kcal/m.h.°C.

It is clear from this that economically appropriate roasting is not possible with known thin-layer processes. The results obtained in comparative testing under optimal thin-layer conditions also show that the cocoa paste thus prepared is not refined thereby to its final state for the purpose of finishing (tumbling in a conche). This is because the paste is not yet sufficiently dehydrated, deacidified and degassed. This means that the chocolate paste prepared therefrom will have to be tumbled in a conche for a relatively long time, say approximately 24 hours, or else that the cocoa paste roasted by thin-layer processes will have to undergo further expensive thin-layer treatment for the purpose of degassing, dehydration, and deacidification, in order to reduce energy-consuming and time-consuming tumbling in a conche to half to one third of the time which would otherwise be required.

Regarding the question of aroma formation during roasting, the following must be borne in mind with respect to the so-called preliminary aroma steps: the formation of cocoa aroma during roasting of dry raw cocoa presupposes that its preliminary steps are present and can react with one another. Amino acids and reducing sugars which are to be considered as preliminary steps arise due to postmortal, enzymatic hydrolysis in the water-containing seed in the course of fermentation. Since fermentation never takes place under optimal conditions and even takes place, as a rule, under relatively poor conditions, the preliminary aroma steps are distributed throughout the individual beans in a widely different concentration. Crushing the dried and shelled cocoa beans into a cocoa paste does not itself provide any substantial improvement in this respect since here, also, the preliminary aroma steps are of necessity distributed through the solid particles of cocoa in widely different concentrations. Consequently, a homogenous distribution of preliminary aroma steps cannot be achieved solely by a fine distribution of the solid particles of cocoa in the cocoa butter of the cocoa paste.

SUMMARY OF INVENTION

An object of the invention is to provide a process for the roasting of cocoa kernel paste which is economically practical and which fully allows for the theoretically recognized advantages of thin layer roasting, but also permits optimal cocoa aroma formation and exploitation with regard to the preliminary aroma steps present in the paste and, further, degasses, deacidifies and dehydrates the paste so that it can be brought to its final state for tumbling in a conche whereby the chocolate paste has to be tumbled in a conche only to a minimal degree.

This object is achieved according to the invention with a process of the above-mentioned type having the additional feature that heat is generated in the thin layer of paste by friction and the paste is constantly and partially lifted out of the layer and sprayed back again into the layer, to which gas in the form of hot air is supplied in countercurrent along and through the respraying region whereby the paste is brought to roasting temperature in a first phase and then kept at roasting temperature in a second phase and the temperature is lowered in a final phase.

In contrast to hitherto known processes, therefore, heat is not transmitted directly to the paste by a heated surface carrying the thin layer. Instead the heat is, on the one hand, generated in the paste by friction and, on the other hand supplied only by hot air, the paste being constantly partially lifted out of the layer and sprayed back again.

The entire roasting operation therefore involves constant and relatively wide-ranging (spraying) total enveloping of the paste which prevents underroasting or overroasting and which is also naturally associated with a more thoroughly homogeneous distribution of particles in the total paste and leads to a homogeneous distribution of the different potentials of the preliminary aroma steps.

BRIEF DESCRIPTION OF DRAWING

The method of this invention and the apparatus for practicing it are explained in greater detail hereinafter with reference to the illustrations in the accompanying drawing.

In The Drawing:

FIG. 1 diagrammatically shows the apparatus of the invention;

FIG. 2 is a diagrammatic cross-section view of one of the thin-layer stages;

FIG. 3 is a horizontal cross-section view of the stage taken along line 3—3 of FIG. 2; and FIG. 4 is a horizontal cross-section view taken along line 4—4 of FIG. 3.

DETAILED DESCRIPTION

In the description which follows "partially lifted out of the paste" means that in regions where the paste is lifted from the surface carrying the layer, a different operation takes place than in the case of the above-mentioned and known thin-layer evaporators in which, in the direction or rotation, the paste is merely pushed together in front of the rotor blades into a constantly rotating roll of paste, whereby it is necessary to maintain the thin layer. According to the invention, the paste can reach again behind the rotor blades to a certain extent.

Hot air is preferably brought to 100° to 130° C. in the process according to the invention and directed through the spraying region.

In the roasting treatment of the cocoa paste according to the invention, there is included a combined thin-layer and spraying treatment. This comprises, on the one hand, heat generation in the paste by shearing forces in the cocoa and friction and, on the other hand by the supply of hot air. The thin layer has a thickness of about 0.3–0.9 mm. as contrasted to some other so-called thin layer processes wherein the thickness is about 1.5–3.0 mm. Not only is the hot air guided along the thin layer, but also the sprayed paste particles are washed by the hot air in the spraying region. As a result there is obtained surprisingly a highly uniform harmonic cocoa aroma with a slightly chocolate-like character and pronounced aroma peaks even in the roasting phase, the aroma intensity being substantially higher than in cocoa paste which has been obtained from the same bean and origin with conventional cocoa bean roasting.

It was also found surprisingly that this result can be further improved if, before being spread into a thin layer, the cocoa liquid to be roasted is innoculated continuously with water in a quantity of approximately 0.5 to 1.5% by weight relative to the total quantity. This water is preferably distributed homogeneously during transport of the paste in the shearing field. The quantity of water to be innoculated can also have added to it before innoculation reducing sugars such as glucose and/or fructose in a soluble quantity which can be innoculated together with the water into the paste (about 50% relative to water).

Although this mode of treatment leads to optimal results it should be noted that the roasting process should be preferably applied with an innoculated quantity of water which is very finely distributed by the strong shearing field. The addition of water, which is normally contradictory to a roasting process, has its optimizing and surprising effect in that it brings about a better distribution in the total paste from the existing distribution of preliminary aroma steps.

The process according to the invention can be carried out with apparatus according to U.S. Pat. No. 3,506,245 in conjunction with apparatus according to U.S. Pat. No. 3,955,489 for generating the strong shearing field. The latter apparatus is connected to the conveying line between an innoculation station and the apparatus according to U.S. Pat. No. 3,506,245. Although such a combination is already known from U.S. Pat. No. 3,985,607, this combination is provided exclusively for treatment of the cocoa paste after roasting. That is, the use of the apparatus according to U.S. Pat. No. 3,506,245 alone or in combination with that according to U.S. Pat. No. 3,955,489 has other effects on the thus treated paste, namely, a decisively better distribution of the preliminary aroma steps during or, in the case of the preferred process mode, before and during the roasting treatment.

EXAMPLE I

For a cocoa paste throughput of 1,000 kg/hr. and an air throughput of 12 m$^3$/min, an optimal process range was determined. Cocoa kernel fragments containing approximately 4% $H_2O$ were used. Cocoa paste was obtained after milling containing approximately 3% $H_2O$. During the processing, enrichment of the cocoa paste was effected by 0.5% $H_2O$ to approximately 3.5% $H_2O$. Paste temperature in the thin-layer spraying roaster was approximately 115° C. Average duration of the paste in the roaster was approximately 1 minute. Water content of the roasted cocoa paste was approximately 0.7% $H_2O$.

Taste and sense judgment evaluated the roasted cocoa paste to be characterized by a highly homogeneous, harmonic cocoa aroma with a slightly chocolate-like character and pronounced aroma peak. There was obtained an aroma intensity which was substantially higher than with a cocoa paste obtained from the same bean and origin, but which was subjected to conventional cocoa bean roasting.

EXAMPLE II

Bitter chocolate was made from cocoa paste roasted by the thin-layer spraying method described in Example I and from cocoa paste roasted conventionally. The time required for tumbling in a conche was compared for the same final viscosity and the same flavor quality. The result for the conventional time required for tumbling in a conche was 24 hours. For the process of the invention, the time required for tumbling in a conche was 6 hours. Tumbling was carried out in conches of conventional design.

From a sense and taste comparison of the chocolate, it was determined that the chocolate prepared according to the invention had a substantially more harmonic chocolate aroma with a pronounced aroma peak and, consequently, was of better quality than the chocolate prepared by the conventional method.

EXAMPLE III

A covering was obtained from a mixture of 52% of cocoa paste roasted by the thin-layer spraying method of Example I and 48% sugar. After being tumbled in a conche for 6 hours the covering was equal both in flavor and rheologically to a covering obtained from 60% of conventionally prepared cocoa paste and 40% sugar after tumbling in a conche for 24 hours. This means that 8% cocoa paste can be saved in obtaining a product with the same flavor as and equally good flow properties as with conventional techniques.

In conventional bean roasting, cocoa butter is diffused into the cocoa shells and is lost with them during shelling. Contrary thereto, due to the fact that the beans are dried to only approximately 4% $H_2O$ content for thin-layer spraying roasting according to the invention, there occurs practically no diffusion of cocoa butter into the shells in the process of the invention. Measurements have shown that the gain thereby in cocoa butter is approximately 1 to 2%.

The results show that due to thin-layer spraying roasting, there are obtained in comparison with conventional roasting considerable economic advantages which have the effect that the aroma yield and flavor quality is increased. Cocoa paste can be saved as a result. The loss of cocoa butter which occurs in conventional roasting due to diffusion into the shells is prevented and the time required for tumbling in a conche is reduced.

In a manner suggested generally above, the possibility exists of artificially increasing the potential of unroasted cocoa paste for the preliminary aroma steps, as a result of which the aroma yield in thin-layer spraying roasting is further increased as next explained.

Since the preliminary aroma steps present in the cocoa beans are determined quantitatively not only by pretreatment such as by fermentation and so forth, but also by the type of beans and their origin, there are correspondingly wide differences. Thus, for example, the Lome type has, as a rule, with the same treatment, a considerably lower potential in aroma steps (reducing sugars and amino acids) than the Arriba type. Consequently, after roasting, this type also furnishes a relatively lower aroma yield. It is known that, upon roasting, the reducing sugars of the cocoa bean are reduced to approximately half their original value. In order to increase the aroma yield in cocoa types of low potential in preliminary aroma steps, the preliminary aroma steps can advantageously be increased artificially. This can be effected by dissolving reducing sugars such as glucose and/or fructose or the like in the water phase and innoculating and dispersing them in the cocoa paste in the above-described way. For structural reasons, but also so as to enable the roasting operation to be carried out more precisely, the process is advantageously and preferably executed in three phases separate from one another, that is, the paste is conveyed continuously through three thin-layer roasters connected in series, but of identical design. The first stage serves mainly to raise the paste to roasting temperature with simultaneous dehydration and deacidification. In the second stage, the paste is kept at roasting temperature. In the third stage, degassing is effected to eliminate residual undesirable accompanying substances and a lowering of the paste temperature takes place.

EXAMPLE IV

Three thin-layer roasters are connected in series to insure a continuous run of the paste to be roasted through three treatment stages. The paste drawn down by one roaster is conveyed upwards to the top of the next roaster by means of a pump and a line.

Operating dimensions and data:
  Height of thin-layer roaster: approximately 2 m
  Diameter of thin-layer roaster: approximately 0.5 m
  Diameter of the holder of the spraying elements: approximately 0.46 m
  Speed of rotor: approximately 500 rev/min
  Number of lifting and spraying elements engaging in the paste to be roasted: approximately 92 per rotor distributed on 4 rows with an axial distance of about 0.5 m
  Volume of hot air blown into each thin-layer roaster: 4 $m^3$/min
  Temperature of the hot air to be blown in:
    1st stage: approximately 120° C. (range 100°–130° C.)
    2nd stage: approximately 117° C. (range 100°–130° C.)
    3rd stage: approximately 80° C. (range 70°–80° C.)
  Quantity of cocoa paste supplied: approximately 1000 kg/h
  Duration of the paste in each state: approximately 20 secs.
  Total: approximately 1 min
  Temperature of the paste supplied: approximately 80° to 90° C.
  Temperature of the finish-roasted paste: approximately 80° to 90° C.
  Power input of the entire installation including hot-air generation, pumps and auxiliary equipment: 70 to 75 kwh/ton FIG. 1 illustrates diagrammatically the arrangement of the different parts of the apparatus in relationship to one another as described hereinafter.

According to FIG. 2, the apparatus comprises a conduit 17 and a shaft 19 concentrically related to the conduit 17, which shaft includes a part 19a formed as a hollow shaft in the processing region. At the bottom, the conduit merges into a discharge chute 20 for the treated cocoa.

The shaft 19 is driven by a power source housed in the machine base. The liquid mass to be processed is passed from a supply 8 (FIG. 1) into an overflow chute 16 from which it passes over overflow edge 15 as a film onto the inner wall of the conduit 17.

In the gap 14 between the shaft 19 and the inner wall of the conduit, peeling and centrifuging elements 23 pass continuously along the inner wall of the conduit with a relatively high speed, said elements 23 being circumferentially spaced around the hollow shaft and axially and vertically juxtaposed along the entire length of the shaft at levels above each other. These peeling and centrifuging elements 23, on the one hand, have a peeling or scraping mouthpiece 24 at their front surfaces and, on the other hand, are provided in their lower horizontal surfaces with spray openings 25 which are slightly offset radially inwards relative to the outer edges of the peeling mouthpieces 24. The result of this configuration is that the mass flowing downwardly as a film along the inner wall of the conduit is received by the peeling mouth pieces and is urged to the downwardly directed spray opening 25 in the sense of the arrow 26 through the channel 27 by virtue of the pressure head occurring and is centrifuged against the inner wall of the conduit. The particles take a generally spiral course until they strike the walls. By this process, the mass thus is constantly lifted off the inner wall of the conduit and centrifuged or sprayed against the inner wall of the conduit again at a lower level. This provides a continuous intermixing, dispersion and relayering of the mass along with an intensive venting, since air is constantly drawn or forced through the cylindrical annular space between elements 17 and 19(a). By this technique, portions are continuously lifted out of the paste which is located on the conduit walls.

The apparatus is vented in stages by the arrangement of a hood 12 and by blowers 11 which are in connection with the hollow shafts 19'. Gas leaves shafts 19' by tubes 19" and streams into the gap 14.

Elements 1, 2 and 3 (FIG. 1) are cylindrical chambers constituting stages 1, 2, and 3 connected in series by lines 4 and 5. Pumps 6 and 7 provide for moving cocoa paste between the stages. Cocoa is supplied by an innoculating element 10 from source 8 via line 9, the water being supplied for innoculation as aforesaid. Degassing as mentioned above takes place by conventional unit 12. Collection is conventionally effected at 13 via line 14.

In the process as described above, the roasting of the cocoa mass takes place with the development of $CO_2$ in the mass. This $CO_2$ is a barrier against heat transfer to the particles of the mass. To overcome this barrier, the thin layer of the invention is substantially continuously peeled and resprayed. The rotation of the elements 23 directly produces the needed heat in the mass by the production of shear and friction forces. The action of this effect allows a very short time to suffice for the passage of the mass through the apparatus.

Concerning the "shearing field," the so-called shearing gradient D is defined as follows:

$$D = v/a$$

wherein v is the peripheral speed at which element 23 moving the paste is moved; in the present instance it is about 13 m/sec; a is the strength of the paste layer which in the present instance is between 0.5 and 1 mm; the so-called shearing force $\tau$(kg/cm$^2$) equals $\tau = \eta \cdot D = \eta \cdot (v/a)$ wherein $\eta$ is the viscosity (Poise).

The average shearing gradient D in the present instance is 26,000 sec.$^{-1}$ at viscosities of between 10 and 100 Poise. The dissipation energy, i.e. the energy transformed from the mechanically supplied energy into frictional heat, is 85-90%.

In U.S. Pat. No. 3,985,607, the object was to attain as large a surface renewal per unit of time as possible to cause an intensive substance and heat exchange. The question of supplied energy in this connection was relevant only in the economical sense, i.e. it was the object to operate with an as low an energy supply as possible and to supply the heat mainly from the outside.

In the present instance, however, it is intended for the cocoa mass to be roasted and it is a main object to attain a high energy density and to convert the mass to paste directly by friction; i.e., to attain the required energy density other than through heat transfer at the walls. It is absolutely surprising that in this manner a satisfactory roasting could be achieved, and it is achievable, by way of illustration, by use of the peripheral speed of about 13 m./sec., as mentioned above.

In the aforegoing, the paste is to be as finely distributed as possible. Preferably, 99% of the particles are to be under 30$\mu$. However, in practice, a satisfactory paste treatment and roasting are achievable even if 25% of the particles are of a size to be retained on a 30$\mu$ screen. This applies to all types of cocoa. The viscosity which, as indicated above, is between 10 and 100 Poise, is virtually dependent on the grain size and the grease and water content.

In the above description, there is no difference intended between the meaning of the terms "paste" and "liquid." In all cases, it is a fluidizable and pumpable mass, which is meant and which can also be spread in a thin layer.

The development of $CO_2$, in form of a thin gaseous layer between the wall for heat transfer and the mass, would normally lead to the danger of overroasting the mass, since a bigger temperature gradient is needed to overcome the gas barrier. To prevent this situation of the prior art, the thin layer of the invention is always disturbed, and the peeled mass is always resprayed and substantially the entire mass is permanently in contact with the countercurrent of air in the gap.

What is claimed is:

1. A process comprising roasting liquid cocoa paste by applying the same as a thin layer which is advanced on an unheated surface and heating the paste by passing a hot gas along the layer and by generating shearing and friction forces in said layer, said shearing and friction forces being generated by scraping paste out of said layer and spraying the thusly scraped paste back into the layer.

2. A process as claimed in claim 1, comprising adding 0.5 to 1.5% by weight of water to the paste.

3. A process as claimed in claim 2, comprising adding sugar to the water.

4. A process as claimed in claim 1 wherein the paste is brought to a viscosity of about 10 to 100 Poises.

5. A process as claimed in claim 1 wherein cocoa particles in the paste are substantially all smaller than 30$\mu$.

6. A process as claimed in claim 5 wherein up to about 25% of the particles can be about 30$\mu$.

7. A process as claimed in claim 4 wherein the paste is treated with a shearing gradient in the order of 26,000 sec.$^{-1}$.

8. A process for the continuous roasting of cocoa paste comprising applying liquid cocoa paste in a thin layer onto an unheated surface along which the paste runs, rinsing said paste with a gas flowing in countercurrent thereto, generating heat in the thin layer of paste by shearing and friction forces and continuously partially lifting paste out of the layer and spraying the same back again into the layer in a respraying action, the paste being brought to roasting temperature in a first phase, kept at said roasting temperature in a second phase, and the temperature of the paste being lowered in a final phase, the gas being hot air which is conveyed through the respraying region at a temperature of approximately 100° to 130° C. in the first two phases and at approximately 70° to 80° C. in the final phase, the paste being brought to and kept at said roasting temperature under the conjoint effect of the hot air and said shearing and friction forces without heat transfer via said surface along which the paste runs, the lifting of the paste and its spraying back into the layer preventing development of a thermal barrier of $CO_2$ between the paste and said surface on which it runs.

9. A process according to claim 8, wherein the three phases are effected separately from one another with a continuous overall run.

10. A process according to claim 8, wherein the paste to be roasted is introduced into the first phase at approximately 70° to 100° C. and is withdrawn from the final phase at 70° to 100° C.

11. A process according to claim 8, wherein the paste to be roasted is innoculated continuously with water in a quantity of approximately 0.5 to 1.5% by weight relative to the total quantity of paste and, during transport in the first phase, said water is distributed homogeneously in the paste with a strong shearing field.

12. A process according to claim 11, wherein before innoculation the quantity of water to be innoculated has added thereto, in a soluble quantity, a reducing sugar which is innoculated together with the water into the paste.

13. A process according to claim 12, wherein the sugar is glucose or fructose.

14. A process according to claim 11, wherein the paste is innoculated with water prior to being applied in a thin layer.

15. A process according to claim 8, wherein gas is evacuated from the final stage.

16. A process according to claim 8, wherein gas is introduced into each phase at about 4 $m^3$/min.

17. A process according to claim 8, wherein the paste is applied at a rate of about 1000 Kg/h.

18. A process according to claim 8, wherein the paste traverses each phase in about 20 seconds.

19. A process according to claim 8, wherein the paste is lifted out of the layer and sprayed back into the layer with a rotor rotating at about 500 R.P.M.

20. A process as claimed in claim 8 or 1 wherein the thin layer is between about 0.3 and 0.9 mm. in thickness.

21. A process as claimed in claim 1 wherein said hot gas is passed in counter current with said thin paste layer.

* * * * *